United States Patent
Sato et al.

(10) Patent No.: US 11,150,649 B2
(45) Date of Patent: Oct. 19, 2021

(54) ABNORMALITY DETECTION DEVICE (71) Applicant: TOYOTA JIDOSHA KABUSHIKI KAISHA, Toyota (JP)

(72) Inventors: Kunihito Sato, Mishima (JP); Nobuhide Kamata, Susono (JP); Bunyo Okumura, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/980,001

(22) Filed: May 15, 2018

(65) Prior Publication Data

US 2018/0335774 A1 Nov. 22, 2018

(30) Foreign Application Priority Data

May 18, 2017 (JP) .............................. JP2017-099115

(51) Int. Cl.
  *G05D 1/00* (2006.01)
  *B60W 50/00* (2006.01)
  (Continued)

(52) U.S. Cl.
  CPC ....... *G05D 1/0061* (2013.01); *B60W 50/0097* (2013.01); *B60W 50/0098* (2013.01);
  (Continued)

(58) Field of Classification Search
  CPC .................................................. G05D 1/0061
  (Continued)

(56) References Cited

U.S. PATENT DOCUMENTS 4,905,783 A * 3/1990 Bober .................. B60G 17/015
  180/422
8,024,084 B2 * 9/2011 Breed ................. B60C 23/0493
  340/438
(Continued)

FOREIGN PATENT DOCUMENTS

EP 1857303 A3 * 5/2006 ............ B60T 8/1755
EP 2673175 A1 * 12/2013 ............ B60T 8/1755
(Continued)

OTHER PUBLICATIONS

US 8,983,781 B2, 03/2015, Urmson et al. (withdrawn)
(Continued)

*Primary Examiner* — Jean Paul Cass
(74) *Attorney, Agent, or Firm* — Sughrue Mion, PLLC (57) ABSTRACT

An abnormality detection device includes a sensor configured to detect an external environment of a vehicle and an electronic control unit configured to: detect a traveling state of the vehicle; acquire a control command value for the vehicle in automatic driving control, the vehicle being caused to travel automatically in the automatic driving control; determine, based on a difference between the traveling state and the control command value, whether the traveling state is abnormal; determine, based on a detection result from the sensor, whether the external environment is suitable for execution of the automatic driving control; and determine that an abnormality has occurred in an automatic driving system when it is determined that the traveling state is abnormal and it is determined that the external environment is suitable for the execution of the automatic driving control, the automatic driving system performing the automatic driving control.

12 Claims, 7 Drawing Sheets

(51) Int. Cl.
*B60W 50/14* (2020.01)
*G05D 1/02* (2020.01)

(52) U.S. Cl.
CPC ........... *B60W 50/14* (2013.01); *G05D 1/0248* (2013.01); *B60W 2050/0072* (2013.01); *B60W 2050/143* (2013.01); *B60W 2050/146* (2013.01); *B60W 2420/42* (2013.01); *B60W 2420/52* (2013.01); *B60W 2520/105* (2013.01); *B60W 2520/125* (2013.01); *B60W 2520/14* (2013.01); *B60W 2552/35* (2020.02); *B60W 2556/00* (2020.02); *G05D 1/0274* (2013.01); *G05D 1/0278* (2013.01); *G05D 2201/0213* (2013.01)

(58) Field of Classification Search
USPC .......................................................... 701/23
See application file for complete search history.

(56) References Cited

U.S. PATENT DOCUMENTS

| | | | | |
|---|---|---|---|---|
| 8,618,922 | B2 * | 12/2013 | Debouk | B60W 50/038 340/439 |
| 8,630,806 | B1 | 1/2014 | Zhu | |
| 8,849,494 | B1 * | 9/2014 | Herbach | B60W 60/0015 701/24 |
| 8,994,776 | B2 * | 3/2015 | Sutherland | B25J 5/007 348/14.05 |
| 8,996,224 | B1 * | 3/2015 | Herbach | G05D 1/0011 180/116 |
| 9,429,657 | B2 * | 8/2016 | Sidhu | G01S 19/34 |
| 9,499,172 | B2 | 11/2016 | Urmson et al. | |
| 9,720,072 | B2 * | 8/2017 | McCloskey | G01S 7/023 |
| 9,766,605 | B1 * | 9/2017 | Izadian | H01Q 21/0087 |
| 9,852,475 | B1 * | 12/2017 | Konrardy | H04W 4/90 |
| 9,956,961 | B2 * | 5/2018 | Ishikawa | G05D 1/0061 |
| 10,235,882 | B1 * | 3/2019 | Aoude | G08G 1/164 |
| 10,269,141 | B1 * | 4/2019 | Shotan | G06T 7/80 |
| 10,282,625 | B1 * | 5/2019 | Wengreen | G06K 9/00845 |
| 10,286,908 | B1 * | 5/2019 | Wengreen | B60W 30/0956 |
| 10,303,181 | B1 * | 5/2019 | Wengreen | G05D 1/0291 |
| 10,889,304 | B2 * | 1/2021 | Hatano | G05D 1/0088 |
| 2003/0142837 | A1 | 7/2003 | Kondo | |
| 2004/0075741 | A1 * | 4/2004 | Berkey | G08B 13/19636 348/159 |
| 2008/0027590 | A1 * | 1/2008 | Phillips | G05D 1/0088 701/2 |
| 2011/0200068 | A1 * | 8/2011 | Piscsalko | G01K 1/026 374/152 |
| 2012/0083959 | A1 | 4/2012 | Dolgov et al. | |
| 2012/0197464 | A1 * | 8/2012 | Wang | B25J 9/1689 701/2 |
| 2014/0114545 | A1 * | 4/2014 | Groger | B60W 10/06 701/70 |
| 2017/0200323 | A1 * | 7/2017 | Allouche | G07C 5/0808 |
| 2017/0294120 | A1 * | 10/2017 | Ootsuji | B60K 28/066 |
| 2017/0300059 | A1 * | 10/2017 | Rust | G01S 7/003 |
| 2017/0349174 | A1 * | 12/2017 | Brandin | B60K 31/0008 |
| 2017/0352201 | A1 | 12/2017 | Kumabe | |
| 2018/0032079 | A1 * | 2/2018 | Nishi | G05D 1/0214 |
| 2018/0113200 | A1 * | 4/2018 | Steinberg | G02B 26/10 |
| 2019/0033459 | A1 * | 1/2019 | Tisdale | G01S 17/89 |
| 2019/0050718 | A1 * | 2/2019 | Tickoo | G06N 3/063 |
| 2019/0052792 | A1 * | 2/2019 | Baba | H04N 5/2355 |
| 2019/0120967 | A1 * | 4/2019 | Smits | G01S 17/936 |
| 2020/0209851 | A1 * | 7/2020 | Iwamoto | B60W 40/09 |

FOREIGN PATENT DOCUMENTS

| | | |
|---|---|---|
| JP | H11-2321 A | 1/1999 |
| JP | 2000-203307 A | 7/2000 |
| JP | 2000-211422 A | 8/2000 |
| JP | 2009-042177 A | 2/2009 |
| JP | 2016-128985 A | 7/2016 |
| JP | 6013340 B2 | 9/2016 |
| WO | 02/067192 A1 | 8/2002 |

OTHER PUBLICATIONS

Google Machine Translation of Japanese patent Application Pub. No. JP2015230573A to shota Ishikawa (U.S. Pat. No. 9,956,961 B2)(2014).*

* cited by examiner

ABNORMALITY DETECTION DEVICE

INCORPORATION BY REFERENCE

The disclosure of Japanese Patent Application No. 2017-099115 filed on May 18, 2017 including the specification, drawings and abstract is incorporated herein by reference in its entirety.

BACKGROUND

1. Technical Field

The disclosure relates to an abnormality detection device.

2. Description of Related Art

An automatic driving system that allows a vehicle to travel automatically is described in Japanese Patent No. 6013340 (JP 6013340 B). The automatic driving system described in JP 6013340 B detects an abnormality of a vehicle (abrasion of a brake) by comparing an expected braking distance with a braking distance traveled before the vehicle actually stops when the brake is operated.

SUMMARY

For example, in the automatic driving system described in JP 6013340 B, when a hydroplaning phenomenon occurs in bad road conditions such as a case in which there are puddles on a road surface, the braking distance traveled before the vehicle actually stops increases and thus it may be erroneously determined that an abnormality has occurred in the vehicle. Accordingly, the disclosure provides a technique capable of accurately detecting an abnormality of an automatic driving system in consideration of an external environment of a vehicle.

An aspect of the disclosure provides an abnormality detection device. The abnormality detection device according to the aspect includes a sensor configured to detect an external environment of a vehicle and an electronic control unit configured to: detect a traveling state of the vehicle; acquire a control command value for the vehicle in automatic driving control, the vehicle being caused to travel automatically in the automatic driving control; determine, based on a difference between the traveling state and the control command value, whether the traveling state is abnormal; determine, based on a detection result from the sensor, whether the external environment is suitable for execution of the automatic driving control; and determine that an abnormality has occurred in an automatic driving system when it is determined that the traveling state is abnormal and it is determined that the external environment is suitable for the execution of the automatic driving control, the automatic driving system performing the automatic driving control.

The case in which it is determined that the external environment is an environment suitable for execution of automatic driving control but it is determined that the traveling state of the vehicle is abnormal is considered to be a state in which an abnormality has occurred in the automatic driving system and thus the vehicle cannot travel normally. Accordingly, the abnormality detection device determines whether an abnormality has occurred in the automatic driving system in consideration of an external environment of the vehicle (whether the external environment is an environment suitable for automatic driving control) in addition to the traveling state of the vehicle. Accordingly, the abnormality detection device can accurately detect an abnormality of the automatic driving system in consideration of an external environment of the vehicle.

In the aspect, the abnormality detection device may further include a database storing a road surface shape of a traveling road of the vehicle as a stored road surface shape. The sensor may include a LIDAR configured to irradiate surroundings of the vehicle with light and configured to detect reflected light of the irradiated light. The sensor may be configured to detect a road surface shape of the traveling road as a detected road surface shape based on a detection result from the LIDAR. The electronic control unit may be configured to determine, when a difference between the stored road surface shape of the surroundings of the vehicle and the detected road surface shape is less than a predetermined determination threshold value, that the external environment is suitable for the execution of the automatic driving control.

In this case, the abnormality detection device can determine whether the external environment of the vehicle is an environment suitable for execution of automatic driving control based on a difference between the road surface shape stored in the database and the road surface shape detected based on the detection result from the LIDAR.

In the aspect, the sensor may include a LIDAR or a camera. The LIDAR may be configured to irradiate surroundings of the vehicle with light and configured to detect reflected light of the irradiated light. The camera may be configured to capture an image of a traveling road of the vehicle. The electronic control unit may be configured to: detect a measured yaw rate or a measured lateral acceleration of the vehicle as the traveling state; calculate a predicted yaw rate or a predicted lateral acceleration, the predicted yaw rate being a yaw rate when the vehicle travels based on the control command value, the predicted lateral acceleration being a lateral acceleration when the vehicle travels based on the control command value; determine that the traveling state is abnormal when one of conditions are satisfied, the conditions being (i) a condition that a difference between the predicted yaw rate and the measured yaw rate is greater than a predetermined yaw rate threshold value and (ii) a condition that a difference between the predicted lateral acceleration and the measured lateral acceleration is greater than a predetermined lateral acceleration threshold value; detect a road shape of the traveling road based on a detection result from the LIDAR or the image captured by the camera; determine that the external environment is suitable for the execution of the automatic driving control when the road shape detected by the sensor is a straight line; and determine that the abnormality has occurred in the automatic driving system when it is determined that the traveling state is abnormal and it is determined that the external environment is suitable for the execution of the automatic driving control based on the road shape of the traveling road.

For example, when a vehicle travels on a straight road of which the road shape is a straight line and a difference between the actually detected yaw rate or the like and the yaw rate calculated based on the control command value is large, a likelihood that an abnormality in which the vehicle cannot travel straightly such as wheel misalignment of a vehicle or blowout of a tire has occurred is considered. Accordingly, the abnormality detection device determines that an abnormality has occurred in the automatic driving system when it is determined that the traveling state of the vehicle is abnormal based on the yaw rate or the lateral acceleration and it is determined that the external environment is an environment suitable for execution of automatic driving control based on the road surface shape. Accordingly, the abnormality detection device can accurately detect an abnormality in the automatic driving system in consideration of the road shape as the external environment.

In the aspect, the sensor may include at least one of a LIDAR and a camera. The LIDAR may be configured to irradiate surroundings of the vehicle with light and configured to detect reflected light of the irradiated light. The camera may be configured to capture an image of a traveling road of the vehicle. The electronic control unit may be configured to: detect at least one of a measured yaw rate and a measured lateral acceleration of the vehicle as the traveling state; calculate at least one of a predicted yaw rate and a predicted lateral acceleration, the predicted yaw rate being a yaw rate when the vehicle travels based on the control command value, the predicted lateral acceleration being a lateral acceleration when the vehicle travels based on the control command value; determine that the traveling state is abnormal when at least one of conditions are satisfied, the conditions being (i) a condition that a difference between the predicted yaw rate and the measured yaw rate is greater than a predetermined yaw rate threshold value and (ii) a condition that a difference between the predicted lateral acceleration and the measured lateral acceleration is greater than a predetermined lateral acceleration threshold value; detect a road shape of the traveling road based on at least one of a detection result from the LIDAR and the image captured by the camera; determine that the external environment is suitable for the execution of the automatic driving control when the road shape detected by the sensor is a straight line; and determine that the abnormality has occurred in the automatic driving system when it is determined that the traveling state is abnormal and it is determined that the external environment is suitable for the execution of the automatic driving control based on the road shape of the traveling road.

In the aspect, the electronic control unit may be configured to notify a driver of the vehicle that the automatic driving control is switched to a manual driving control in which the driver performs a driving operation of the vehicle, when it is determined that the abnormality has occurred in the automatic driving system.

According to an aspect of the disclosure, it is possible to accurately detect an abnormality of an automatic driving system in consideration of an external environment of a vehicle.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinafter, an abnormality detection device according to an embodiment of the disclosure will be described with reference to the accompanying drawings. In this embodiment, an abnormality detection device is incorporated into an automatic driving system. The automatic driving system into which an abnormality detection device is incorporated will be described below. In description with reference to the drawings, the same elements will be referenced by the same reference signs and description thereof will not be repeated.

Figure 1:
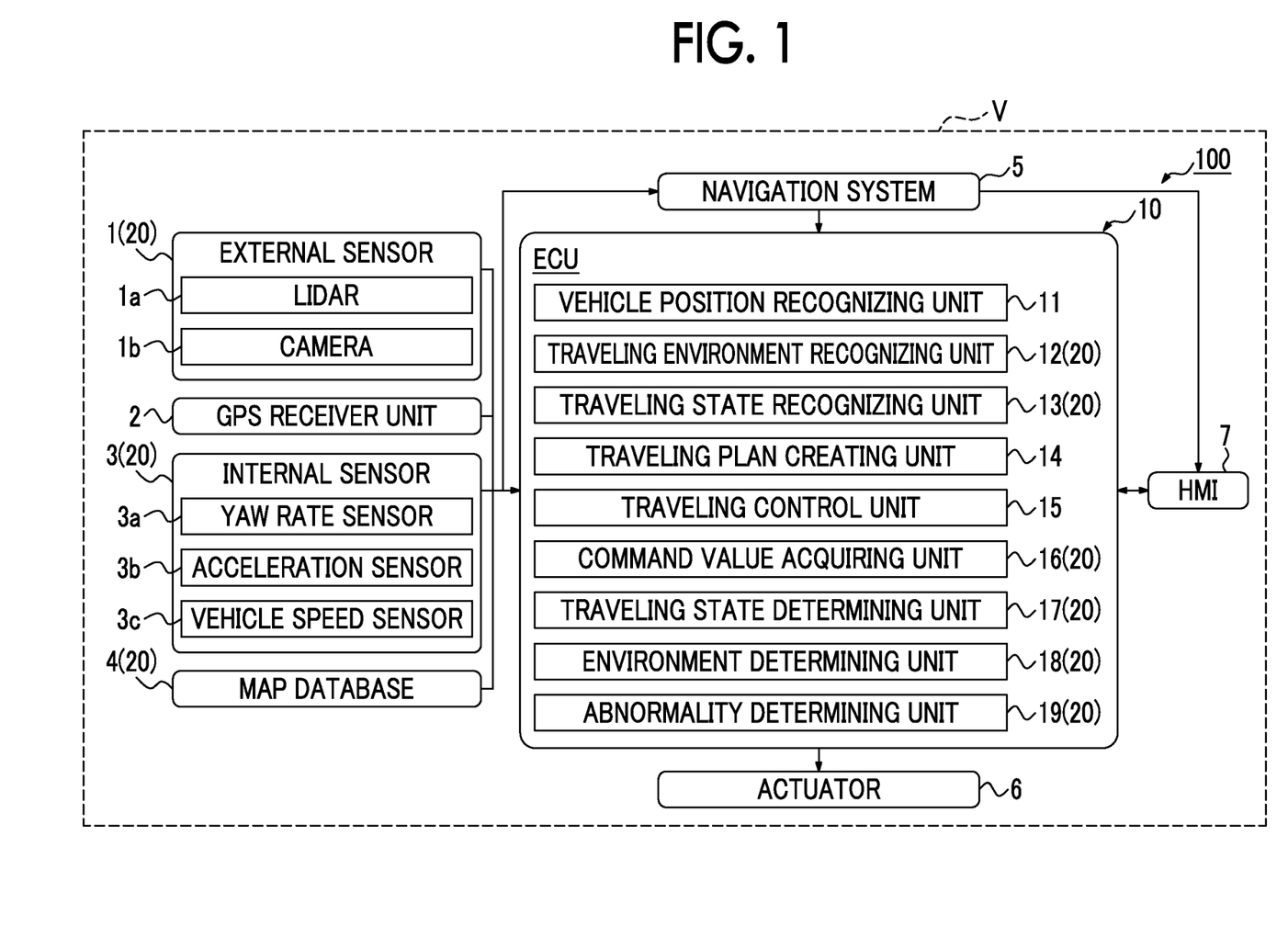
FIG. 1 is a diagram schematically illustrating a configuration of an automatic driving system into which an abnormality detection device according to an embodiment is incorporated.

As illustrated in FIG. 1, the automatic driving system 100 according to the embodiment performs automatic driving control of causing a vehicle V to travel automatically. Accordingly, a driving state of the vehicle V is an automatic driving state. The automatic driving state is a driving state in which the vehicle V travels automatically without a driver performing a driving operation. The automatic driving state is a driving state in which automatic driving control including speed control and steering control of the vehicle V is performed by the automatic driving system 100.

As illustrated in FIG. 1, the automatic driving system 100 includes an electronic control unit (ECU) 10 that performs the automatic driving control. The ECU 10 is an electronic control unit including a central processing unit (CPU), a read only memory (ROM), and a random access memory (RAM). The ECU 10 embodies various functions, for example, by loading a program stored in the ROM into the RAM and causing the CPU to execute the program loaded into the RAM. The ECU 10 may include a plurality of electronic control units. Some of the functions of the ECU 10 which will be described below may be performed by a computer in a facility such as an information management center or a mobile information terminal capable of communicating with the vehicle V.

An external sensor 1, a GPS receiver unit 2, an internal sensor 3, a map database 4, a navigation system 5, an actuator 6, and a human-machine interface (HMI) 7 are connected to the ECU 10.

The external sensor 1 is a detection device that detects the situation around the vehicle V. The external sensor 1 includes a light detection and ranging (LIDAR) 1a and a camera 1b. The LIDAR 1a is a detection device that detects obstacles near the vehicle V using light. The LIDAR 1a irradiates the surroundings of the vehicle V with light and detects reflected light reflected by a road surface of a traveling road on which the vehicle V travels and reflected light reflected by obstacles near the vehicle V. Examples of the obstacles include stationary obstacles such as guard rails and buildings and mobile obstacles such as pedestrians, bicycles, and other vehicles. The LIDAR 1a transmits information on the detected obstacles and the like to the ECU 10.

The camera 1b is an imaging device that images the external situation of the vehicle V. The camera 1b is installed behind a windshield of the vehicle V. The camera 1b transmits imaging information on the external situation of the vehicle V to the ECU 10. The camera may be a monocular camera or a stereoscopic camera. The stereoscopic camera includes two imaging units that are arranged to reproduce binocular parallax. The imaging information of the stereoscopic camera includes information in a depth direction.

The GPS receiver unit 2 is mounted in the vehicle V and functions as a positioning unit that measures a position of the vehicle V. The GPS receiver unit 2 measures the position of the vehicle V (for example, latitude and longitude of the vehicle V) by receiving signals from three or more GPS satellites. The GPS receiver unit 2 transmits information on the measured position of the vehicle V to the ECU 10.

The internal sensor 3 is a detection device that detects a traveling state of the vehicle V. The internal sensor 3 includes a yaw rate sensor 3a, an acceleration sensor 3b, and a vehicle speed sensor 3c. The yaw rate sensor 3a is a detector that detects a yaw rate (a rotational angular velocity) around a vertical axis at the center of the vehicle V. For example, a gyro sensor can be used as the yaw rate sensor 3a. The yaw rate sensor 3a transmits information on the detected yaw rate of the vehicle V to the ECU 10.

The acceleration sensor 3b is a detector that detects acceleration of the vehicle V. The acceleration sensor 3b includes a longitudinal acceleration sensor that detects acceleration in a longitudinal direction of the vehicle V and a lateral acceleration sensor that detects lateral acceleration in a lateral direction of the vehicle V. The acceleration sensor 3b transmits information on the detected acceleration of the vehicle V to the ECU 10. The vehicle speed sensor 3c is a detector that detects a speed of the vehicle V. A wheel speed sensor that is disposed on vehicle wheels of the vehicle V or a drive shaft rotating with the vehicle wheels and detects a rotation speed of the vehicle wheels is used as the vehicle speed sensor 3c. The vehicle speed sensor 3c transmits information on the detected vehicle speed to the ECU 10.

The map database 4 is a database in which map information is stored. The map database 4 is stored in a hard disk drive (HDD) which is mounted in the vehicle V. The map information includes, for example, position information of roads, information on road shapes, position information of crossings and junctions, and speed limits of roads. The information of road shapes includes, for example, type information indicating that a road shape is a curve or a straight line and curvatures of curves. The map information further includes road surface shapes of a traveling road on which the vehicle V travels. A road surface shape refers to a shape in a height direction of a road surface. That is, a road surface shape indicates a road surface height in the horizontal direction at each position. A road surface height in the horizontal direction may include a projection and a depression of the road surface. The map database 4 may be stored in a server that can communicate with the vehicle V.

The navigation system 5 is mounted in the vehicle V and sets a target route in which the vehicle V should travel by automatic driving. The navigation system 5 calculates a target route from the position of the vehicle V to a destination based on the destination set in advance, the position of the vehicle V measured by the GPS receiver unit 2, and the map information of the map database 4. The destination of automatic driving control is set, for example, by an occupant of the vehicle V operating an input button (or a touch panel) provided in the navigation system 5. The target route is set to distinguish lanes of a road. The navigation system 5 can set the target route using a known method. The navigation system 5 notifies an occupant of the vehicle V of the target route by display on a display and output of speech from a speaker. The navigation system 5 outputs information on the target route of the vehicle V to the ECU 10.

The actuator 6 is a device that performs traveling control of the vehicle V. The actuator 6 includes at least a throttle actuator, a brake actuator, and a steering actuator. The throttle actuator controls an amount of air supplied to the engine (a throttle valve opening) in accordance with a control signal from the ECU 10, and controls a driving force of the vehicle V. When the vehicle V is a hybrid vehicle, a control signal from the ECU 10 is input to a motor serving as a power source in addition to the amount of air supplied to the engine and a driving force thereof is controlled. When the vehicle V is an electric vehicle, a control signal from the ECU 10 is input to a motor serving as a power source and a driving force thereof is controlled. The motor serving as a power source in these cases constitutes the actuator 6.

The brake actuator controls a brake system in accordance with a control signal from the ECU 10 and controls a braking force which is applied to the wheels of the vehicle V. A hydraulic brake system can be used as the brake system. The steering actuator controls driving of an assist motor that controls a steering torque in an electric power steering system in accordance with a control signal from the ECU 10. Accordingly, the steering actuator controls a steering torque of the vehicle V.

The HMI 7 is an interface that is used to output and input information between an occupant of the vehicle V and the automatic driving system 100. The HMI 7 includes, for example, a display that displays image information to an occupant, a speaker that outputs speech, and an input button or a touch panel that is used for an occupant to perform an input operation. The HMI 7 transmits information which is input by an occupant to the ECU 10. The HMI 7 displays image information on the display and outputs speech from the speaker in accordance with a control signal from the ECU 10.

The functional configuration of the ECU 10 will be described below. The ECU 10 includes a vehicle position recognizing unit 11, a traveling environment recognizing unit 12, a traveling state recognizing unit 13, a traveling plan creating unit 14, a traveling control unit 15, a command value acquiring unit 16, a traveling state determining unit 17, an environment determining unit 18, and an abnormality determining unit 19. Some functions of the ECU 10 may be performed by a server that can communicate with the vehicle V.

The vehicle position recognizing unit 11 recognizes a position of the vehicle V on a map based on the position information from the GPS receiver unit 2 and the map information in the map database 4. The vehicle position recognizing unit 11 may recognize the position of the vehicle V using an existing SLAM technique based on position information of fixed obstacles such as electric poles which are included in the map information in the map database 4 and the detection result from the external sensor 1.

The traveling environment recognizing unit 12 recognizes an external environment of the vehicle V based on the detection result from the external sensor 1. The traveling environment recognizing unit 12 recognizes the external environment of the vehicle V including positions of obstacles near the vehicle V using a known technique based on captured images from the camera 1b and/or obstacle information from the LIDAR 1a.

The traveling environment recognizing unit 12 recognizes (detects) a road surface shape of a traveling road on which the vehicle V travels using a known technique based on the detection result from the LIDAR 1a. A road surface shape is a shape in the height direction of the road surface. That is, a road surface shape indicates a road surface height at each position in the horizontal direction.

The traveling environment recognizing unit 12 detects a road shape of the traveling road on which the vehicle V travels using a known technique based on the detection result from the LIDAR 1a and/or the captured images from the camera 1b. Here, a road shape is a shape of a road when the traveling road on which the vehicle V travels is viewed from above. The traveling environment recognizing unit 12 detects whether the traveling road is a straight line or a curved line as the road shape. A traveling road of which the road shape is a straight line may include a traveling road of which a curvature (a curvature of a curved line) is less than a predetermined reference curvature in addition to a traveling road of which a curvature is zero. In this way, the external sensor 1 and the traveling environment recognizing unit 12 serve as an external environment detecting unit that detects the external environment of the vehicle V.

The traveling state recognizing unit 13 recognizes (detects) a traveling state of the vehicle V including a yaw rate, acceleration, and a speed of the vehicle V based on the detection result from the internal sensor 3. Specifically, the traveling state recognizing unit 13 detects a yaw rate of the vehicle V based on the yaw rate information from the yaw rate sensor 3a and recognizes the direction of the vehicle V. The traveling state recognizing unit 13 recognizes acceleration in a front-rear direction (longitudinal acceleration) and lateral acceleration of the vehicle V based on the acceleration information from the acceleration sensor 3b. The traveling state recognizing unit 13 recognizes a speed of the vehicle V based on the vehicle speed information from the vehicle speed sensor 3c. In this way, the internal sensor 3 and the traveling state recognizing unit 13 serve as a traveling state detecting unit that detects the traveling state of the vehicle V.

The traveling state recognizing unit 13 may recognize the speed of the vehicle V based on a variation in position of the vehicle V recognized by the vehicle position recognizing unit 11. The traveling state recognizing unit 13 may recognize the speed of the vehicle V using a Doppler radar that detects a speed based on a frequency shift due to the Doppler effect.

The traveling plan creating unit 14 creates a traveling plan of the vehicle V based on the target route set by the navigation system 5, the map information in the map database 4, the external environment of the vehicle V recognized by the traveling environment recognizing unit 12, and the traveling state of the vehicle V recognized by the traveling state recognizing unit 13. The traveling plan is a traveling plan for the vehicle to move from the current position of the vehicle V to a preset destination.

The traveling plan includes a control target value for the vehicle V corresponding to the position on the target route of the vehicle V. The position on the target route is a position in an extending direction of the target route on the map. The position on the target route refers to a set longitudinal position which is set at predetermined intervals (for example, 1 m) in the extending direction of the target route. The control target value is a value which serves as a control target of the vehicle V in the traveling plan. The control target value is set in correlation with the set longitudinal positions on the target route. The traveling plan creating unit 14 creates the traveling plan by setting the set longitudinal positions at predetermined intervals on the target route and setting the control target value (for example, a target lateral position and a target vehicle speed) for each set longitudinal position. The set longitudinal position and the target lateral position are information of the longitudinal position and information of the lateral position which are set as a target in the traveling plan.

The traveling control unit 15 performs automatic driving control including speed control and steering control of the vehicle V based on the position on the map of the vehicle V recognized by the vehicle position recognizing unit 11 and the traveling plan created by the traveling plan creating unit 14. The traveling control unit 15 performs the automatic driving control by transmitting various control command values (control signals) to the actuator 6. The control command values are calculated based on the traveling plan and the like. The control command value is a command value for controlling traveling of the vehicle V and examples thereof include a control command value for controlling the speed of the vehicle V, a control command value for controlling the acceleration (the longitudinal acceleration) of the vehicle V, and a control command value for controlling the steering angle. The driving state of the vehicle V enters an automatic driving state when the traveling control unit 15 performs the automatic driving control.

The command value acquiring unit 16 acquires the control command value for the vehicle V which is transmitted to the actuator 6 when the traveling control unit 15 performs the automatic driving control.

The traveling state determining unit 17 determines whether the traveling state of the vehicle V is abnormal based on a difference between the traveling state of the vehicle V recognized by the traveling state recognizing unit 13 and the control command value for the vehicle V acquired by the command value acquiring unit 16. That is, the traveling state determining unit 17 determines that the traveling state of the vehicle V is abnormal when the difference between the actual traveling state of the vehicle V and the traveling state of the vehicle V based on the control command value is large. A specific example of determination conditions which are used to determine whether the traveling state of the vehicle V is abnormal will be described below.

When |longitudinal acceleration of vehicle V−command acceleration|> longitudinal acceleration threshold value is satisfied, the traveling state determining unit 17 determines that the traveling state of the vehicle V is abnormal. Here, "|" and "|" are signs indicating an absolute value. The traveling state determining unit 17 uses the value recognized by the traveling state recognizing unit 13 as the longitudinal acceleration of the vehicle V. The traveling state determining unit 17 uses the control command value for the acceleration (the longitudinal acceleration) of the vehicle V acquired by the command value acquiring unit 16 as the command acceleration. The longitudinal acceleration threshold value is a predetermined value.

When |lateral acceleration of vehicle V−lateral acceleration calculated based on command value|> lateral acceleration threshold value is satisfied, the traveling state determining unit 17 determines that the traveling state of the vehicle V is abnormal. The traveling state determining unit 17 uses the value recognized by the traveling state recognizing unit 13 as the lateral acceleration of the vehicle V. The traveling state determining unit 17 uses lateral acceleration calculated using a known calculation method based on the control command value of the speed of the vehicle V and the control command value of the steering angle acquired by the command value acquiring unit 16 as the lateral acceleration of the vehicle V. The lateral acceleration threshold value is a predetermined value. That is, when a difference between the lateral acceleration calculated based on the control command value acquired by the command value acquiring unit 16 and the lateral acceleration recognized by the traveling state recognizing unit 13 is greater than a predetermined lateral acceleration threshold value, the traveling state determining unit 17 determines that the traveling state of the vehicle V is abnormal.

When |speed of vehicle V−command speed|> speed threshold value is satisfied, the traveling state determining unit 17 determines that the traveling state of the vehicle V is abnormal. The traveling state determining unit 17 uses the value recognized by the traveling state recognizing unit 13 as the speed of the vehicle V. The traveling state determining unit 17 uses the control command value for the speed of the vehicle V acquired by the command value acquiring unit 16 as the command speed. The speed threshold value is a predetermined value.

When |yaw rate calculated based on yaw rate command value for vehicle V|> yaw rate threshold value is satisfied, the traveling state determining unit 17 determines that the traveling state of the vehicle V is abnormal. The traveling state determining unit 17 uses the value recognized by the traveling state recognizing unit 13 as the yaw rate of the vehicle V. The traveling state determining unit 17 uses the yaw rate calculated using a known calculation method based on the control command value for the speed of the vehicle V and the control command value of the steering angle acquired by the command value acquiring unit 16 as the yaw rate calculated based on the command value. The yaw rate threshold value is a predetermined value. That is, the traveling state determining unit 17 calculates the yaw rate when the vehicle V travels based on the control command values acquired by the command value acquiring unit 16, and determines that the traveling state of the vehicle V is abnormal when a difference between the yaw rate calculated based on the control command values and the yaw rate recognized by the traveling state recognizing unit 13 is greater than a predetermined yaw rate threshold value.

The traveling state determining unit 17 determines whether the traveling state of the vehicle V is abnormal based on a variation in a difference between the control command value acquired by the command value acquiring unit 16 and a measured value of the traveling state of the vehicle V. The measured value of the traveling state of the vehicle V is the traveling state (such as a speed) of the vehicle V recognized by the traveling state recognizing unit 13. For example, when the control command value acquired by the command value acquiring unit 16 is a control command value for the speed of the vehicle V, a measured value of the speed of the vehicle V is used as the measured value of the traveling state of the vehicle V. In this way, corresponding values are used as the control command value and the measured value.

Figure 2:
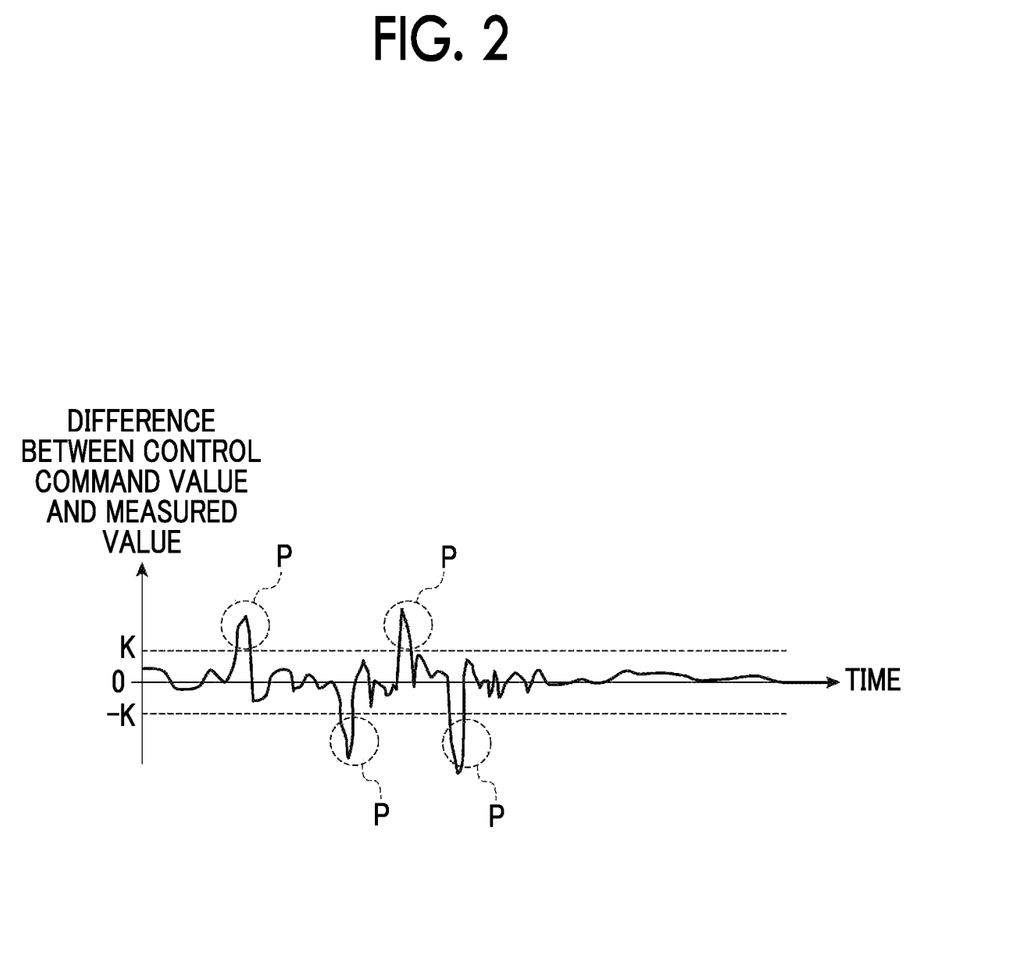
FIG. 2 is a diagram illustrating change of a difference between a control command value and a measured value of a traveling state.

Specifically, as illustrated in FIG. 2, the traveling state determining unit 17 monitors a variation in the difference between the control command value and the measured value of the traveling state. The traveling state determining unit 17 determines whether the difference between the control command value and the measured value is greater than a predetermined variation threshold value K. In FIG. 2, parts in which the difference between the control command value and the measured value is greater than the variation threshold value K are indicated by marks P of dotted circles. When the number of times the difference between the control command value and the measured value exceeds the variation threshold value K per unit time is greater than a predetermined number of times, the traveling state determining unit 17 determines that the traveling state of the vehicle V is abnormal.

The traveling state determining unit 17 determines whether the traveling state of the vehicle V is abnormal by comparing characteristics of the automatic driving system 100 which are specified at the time of design or manufacture with characteristics of an input and an output acquired during execution of automatic driving control. The input and the output acquired during execution of automatic driving control include the control command values acquired by the command value acquiring unit 16 and the traveling state of the vehicle V recognized by the traveling state recognizing unit 13.

Figure 3:
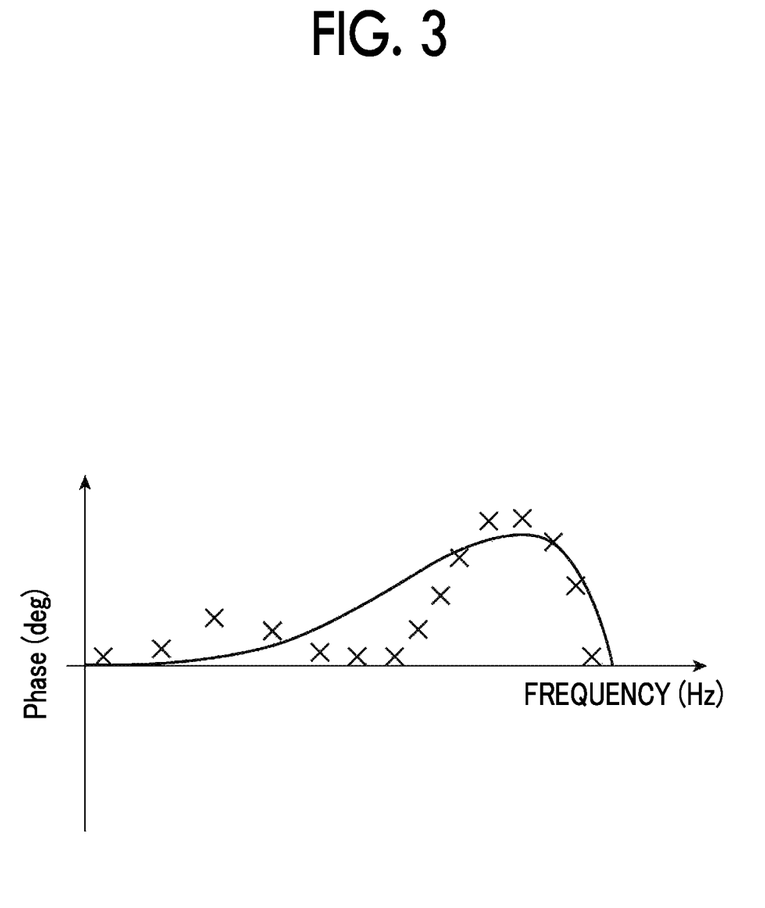
FIG. 3 is a diagram illustrating a. Bode plot of the automatic driving system.

Here, frequency characteristics of the input and the output of the automatic driving system 100 can be ascertained based on information at the time of design or manufacture of the automatic driving system 100. The frequency characteristics acquired based on the information on design or the like are represented, for example, by the Bode plot (corresponding to the solid line) in FIG. 3. On the other hand, during execution of automatic driving control, the frequency characteristics of the input and the output of the system can be dynamically estimated using a known method based on the input and the output of the automatic driving system 100 (corresponding to marks X in FIG. 3). The traveling state determining unit 17 compares the frequency characteristics acquired based on the information of design or the like with the frequency characteristics estimated during execution of automatic driving control and determines that the traveling state of the vehicle V is abnormal when the difference (error) therebetween is greater than a predetermined value.

Figure 4:
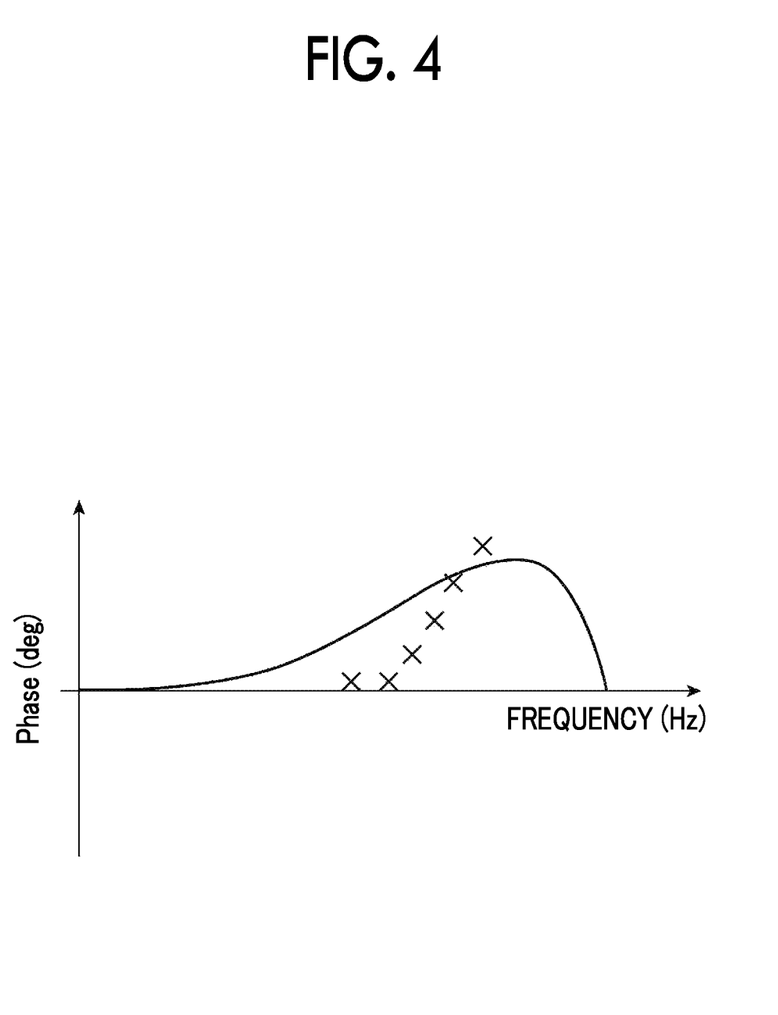
FIG. 4 is a diagram illustrating a Bode plot of the automatic driving system.

During execution of automatic driving control, since a control command value covering wide frequencies cannot be input, the actually estimated frequency characteristics are definitive as illustrated in FIG. 4 (corresponding to marks X in FIG. 4). In this case, the traveling state determining unit 17 determines that the traveling state of the vehicle V is abnormal when the difference between the frequency characteristics estimated during execution of automatic driving control and the frequency characteristics acquired based on the information of design or the like is greater than a predetermined value.

When one of determination conditions using the number of times the longitudinal acceleration, the lateral acceleration, the speed, the yaw rate, and the control command value per unit time exceed the threshold values and the frequency characteristics of the input and the output of the automatic driving system 100 is satisfied, the traveling state determining unit 17 determines that the traveling state of the vehicle V is abnormal. Here, when two or more of the determination conditions are satisfied, the traveling state determining unit 17 may determine that the traveling state of the vehicle V is abnormal.

Figure 5:
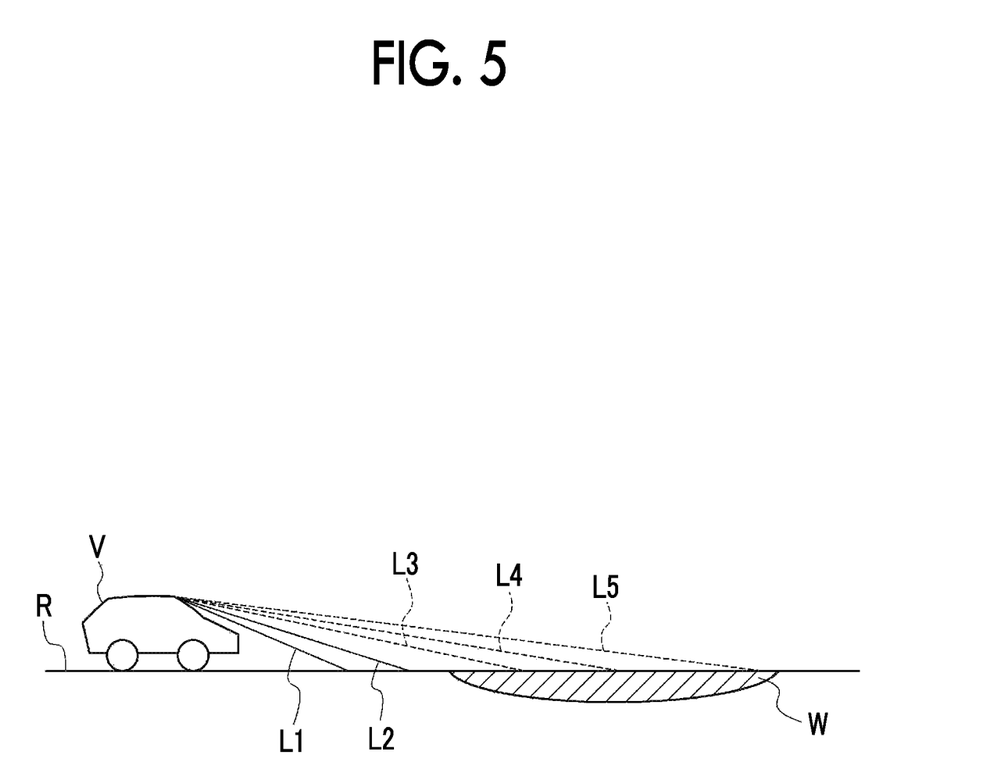
FIG. 5 is a diagram illustrating light beams with which a road surface is irradiated by a LIDAR.

The environment determining unit 18 determines whether the external environment of the vehicle V is an environment suitable for execution of automatic driving control using various methods. Specifically, the environment determining unit 18 determines whether the external environment of the vehicle V is an environment suitable for execution of automatic driving control based on the recognition result from the traveling environment recognizing unit 12. For example, based on a ratio of the number of light beams reflected by the road surface and detected by the LIDAR 1*a* when the LIDAR 1*a* has irradiated the road surface with a plurality of light beams, the environment determining unit 18 may determine whether the external environment of the vehicle V is an environment suitable for execution of automatic driving control. For example, as illustrated in FIG. 5, the LIDAR 1a mounted in the vehicle V irradiates a traveling road R of the vehicle V with light beams L1 to L5. It is assumed that the light beams L1 and L2 emitted from the LIDAR 1a are reflected by the traveling road R and detected by the LIDAR 1a. It is assumed that the light beams L3 to L5 emitted from the LIDAR 1a are not detected by the LIDAR 1a due to the presence of a puddle W and the like on the traveling road R. In this way, some of the light beams with which the traveling road R may be irradiated by the LIDAR 1a are not detected depending on the external environment of the vehicle V.

Specifically, it is assumed that the LIDAR 1a irradiates the traveling road R with N light beams and detects m light beams reflected by the road surface. The environment determining unit 18 calculates m/N as a ratio at which the traveling road R has been detected by the LIDAR 1a. When the calculated ratio m/N is greater than a predetermined beam number threshold value, the environment determining unit 18 determines that the external environment of the vehicle V is an environment suitable for execution of automatic driving control. That is, when detection accuracy of the traveling road R by the LIDAR 1a is high (when the number of light beams reflected from the traveling road R and detected is large (the ratio is high)), the environment determining unit 18 determines that the external environment of the vehicle V is an environment suitable for execution of automatic driving control.

Figure 6:
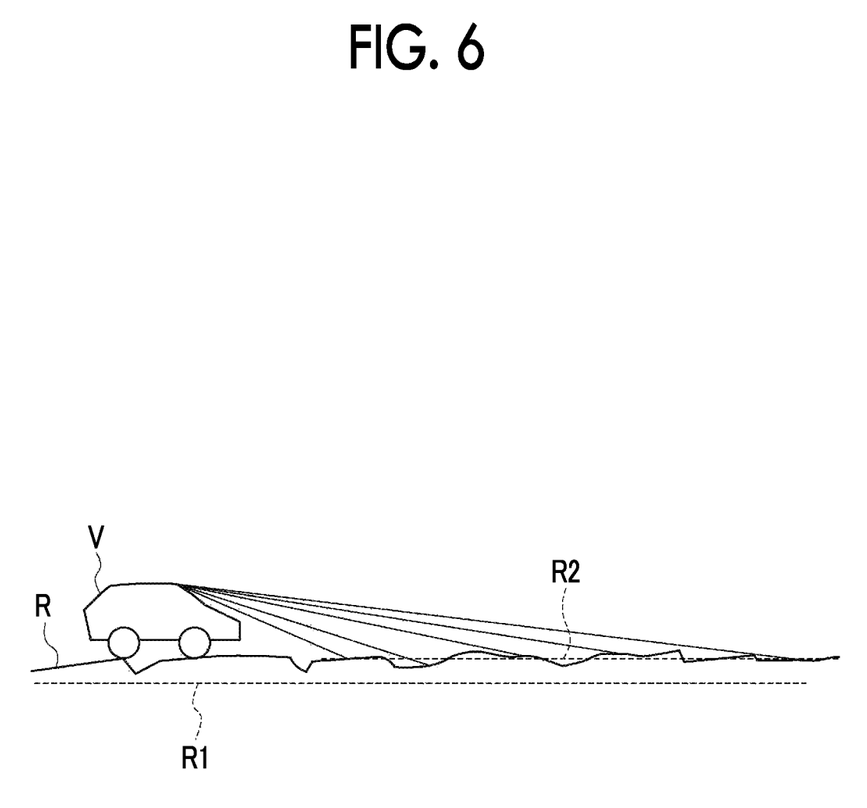
FIG. 6 is a diagram illustrating a recognized road surface shape and a road surface shape stored in a map database.

For example, when a difference δ between the road surface shape (the road surface height) stored in the map database 4 and the road surface shape (the road surface height) recognized by the traveling environment recognizing unit 12 is less than a predetermined determination threshold value as illustrated in FIG. 6, the environment determining unit 18 determines that the external environment of the vehicle V is an environment suitable for execution of automatic driving control. In FIG. 6, a traveling road R is a traveling road on which the vehicle V actually travels. A road surface R1 is a road surface of the traveling road based on the road surface shape stored in the map database 4. A road surface R2 is a road surface of the traveling road based on the road surface shape recognized by the traveling environment recognizing unit 12. Here, the road surface shape which is estimated based on the detection result from the LIDAR 1a is defined as a road surface shape h(x, y). The road surface shape stored in the map database 4 is defined as a road surface shape H(x, y). A difference in road surface shape δ is expressed by Equation (1). Here, "x" and "y" denote the horizontal direction in a coordinate system centered on the vehicle V. Ψ denotes an area near the vehicle V (for example, an area within a radius of 30 m from the vehicle V).

[Equation 1]

$$\delta = \sum_{x,y \in \Omega} |h(x, y) - H(x, y)| \qquad (1)$$

The road surface shape h(x, y) is estimated according to Equation (2). Here, $p^n$ denotes a three-dimensional vector indicating a reflecting point acquired from an n-th light beam emitted from the LIDAR 1a. Subscripts (x), (y), and (z) denote coordinate values.

[Equation 2]

$$\arg\min_h = \sum_{n \in N} (h(p_x^n, p_y^n) - p_z^n)^2 \qquad (2)$$

The function h approximates the road surface shape. When a road surface is approximated by a plane defined in a three-dimensional space, the function h is expressed by Equation (3). Here, h(x, y)=0 denotes a road surface.

$$h(x,y)+ax+by+c \qquad (3)$$

The environment determining unit 18 acquires a longitudinal gradient of the road surface (a gradient in the traveling direction of the vehicle V) acquired based on the road surface shape recognized by the traveling environment recognizing unit 12. The environment determining unit 18 determines that the external environment of the vehicle V is an environment suitable for execution of automatic driving control when the acquired longitudinal gradient of the road surface is less than a predetermined gradient threshold value. The environment determining unit 18 may use a longitudinal gradient of the road surface near the vehicle V which is acquired based on the road surface shape stored in the map database 4 in addition to the longitudinal gradient of the road surface acquired based on the recognition result from the traveling environment recognizing unit 12.

The environment determining unit 18 determines that the external environment of the vehicle V is an environment suitable for execution of automatic driving control when the road shape recognized by the traveling environment recognizing unit 12 is a straight line. The environment determining unit 18 may use the road shape near the vehicle V stored in the map database 4 in addition to the road shape acquired based on the recognition result from the traveling environment recognizing unit 12.

When the traveling state determining unit 17 determines that the traveling state of the vehicle V is abnormal and the environment determining unit 18 determines that the external environment of the vehicle V is an environment suitable for execution of automatic driving control, the abnormality determining unit 19 determines that an abnormality has occurred in the automatic driving system 100. Here, the state in which an abnormality has occurred in the automatic driving system 100 is a state in which the vehicle V cannot travel or has difficulty in traveling in accordance with the traveling plan. For example, the state in which an abnormality has occurred in the automatic driving system 100 is a state in which an abnormality (malfunction) has occurred in the external sensor 1 or the like. For example, the state in which an abnormality has occurred in the automatic driving system 100 is a state in which an abnormality (malfunction) affecting traveling of the vehicle V has occurred such as a state in which a tire of the vehicle V is blown out or a state in which wheel alignment is deviated.

For example, when the longitudinal gradient of the road surface is small but an error associated with the speed or the acceleration of the vehicle V (a difference from the control command value) is large, the abnormality determining unit 19 determines that an abnormality has occurred in the automatic driving system 100. Specifically, when the traveling state determining unit 17 determines that the traveling state of the vehicle V is abnormal based on the speed or the longitudinal acceleration of the vehicle V and the environment determining unit 18 determines that the external environment of the vehicle V is an environment suitable for execution of automatic driving control based on the longitudinal gradient of the road surface, the abnormality determining unit 19 determines that an abnormality has occurred in the automatic driving system 100. In this case, an abnormality in which travel resistance of the vehicle V increases such as blowout of a tire of the vehicle V or dragging of a foreign substance is considered to occur.

For example, when the road shape is a straight line but an error associated with the yaw rate of the vehicle V or an error associated with the lateral acceleration (a difference from the yaw rate or the lateral acceleration calculated from the control command value) is large, the abnormality determining unit 19 determines that an abnormality has occurred in the automatic driving system 100. The abnormality determining unit 19 may compare the error associated with the yaw rate of the vehicle V or the error associated with the lateral acceleration with a threshold value, and may determine that an abnormality has occurred in the automatic driving system 100 when the error is larger than the threshold value. Specifically, when the traveling state determining unit 17 determines that the traveling state of the vehicle V is abnormal based on the yaw rate or the lateral acceleration of the vehicle V and the environment determining unit 18 determines that the external environment of the vehicle V is an environment suitable for execution of automatic driving control based on the road shape, the abnormality determining unit 19 determines that an abnormality has occurred in the automatic driving system 100. In this case, it is thought that there is a likelihood of occurrence of an abnormality in which the vehicle cannot travel straightly, such as wheel misalignment of a vehicle or blowout of a tire.

When it is determined whether an abnormality has occurred in the automatic driving system 100, the abnormality determining unit 19 can determine whether an abnormality has occurred based on a combination other than a combination of an abnormality type of the traveling state of the vehicle V described above as an example and a determination reference for determining whether the external environment is an environment suitable for execution of automatic driving control. When both of the error associated with the yaw rate of the vehicle V and the error associated with the lateral acceleration are greater than the threshold values, the abnormality determining unit 19 may determine that an abnormality has occurred in the automatic driving system 100.

When the abnormality determining unit 19 has determined that an abnormality has occurred in the automatic driving system 100, the automatic driving system 100 performs, for example, one or a combination of two or more of the following operations. The automatic driving system 100 notifies a driver of the vehicle V that the automatic driving control is switched to manual driving control in which the driver should perform a driving operation using the HMI 7. The automatic driving system 100 does not permit switching to the automatic driving control again after switching to the manual driving control. The automatic driving system 100 changes a destination in the automatic driving control of the vehicle V to a nearby repair shop. The automatic driving system 100 does not perform execution of automatic driving control unless the vehicle has been repaired in a repair shop or the like.

The abnormality detection device 20 that detects an abnormality in the automatic driving system 100 is constituted by the internal sensor 3 and the traveling state recognizing unit 13 that serve as the traveling state detecting unit, the command value acquiring unit 16, the traveling state determining unit 17, the external sensor 1 and the traveling environment recognizing unit 12 that serve as the external environment detecting unit, the environment determining unit 18, the abnormality determining unit 19, and the map database 4 that stores road surfaces.

Figure 7:
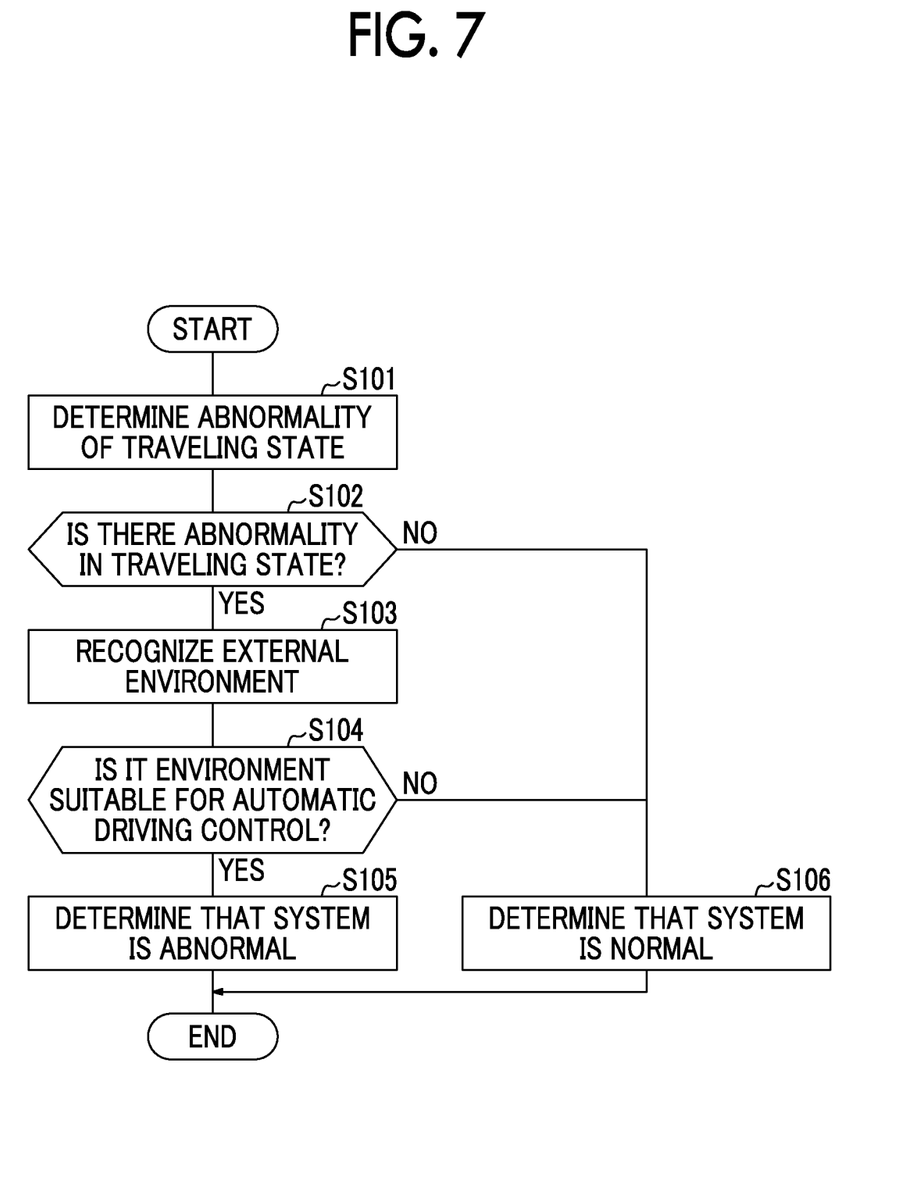
FIG. 7 is a flowchart illustrating a flow of a routine of determining an abnormality in the automatic driving system.

A flow of a routine of causing the abnormality detection device 20 to determine an abnormality in the automatic driving system 100 will be described below with reference to FIG. 7. The routine illustrated in FIG. 7 is performed when automatic driving control of the vehicle V is being executed based on a traveling plan. In the routine illustrated in FIG. 7, the routine is restarted from START when a predetermined time elapsed after the routine has ended.

As illustrated in FIG. 7, the traveling state determining unit 17 determines whether the traveling state of the vehicle V is abnormal based on a difference between the traveling state of the vehicle V recognized by the traveling state recognizing unit 13 and the control command value for the vehicle V (S101). When the traveling state of the vehicle V is abnormal (YES in Step S102), the traveling environment recognizing unit 12 recognizes the external environment of the vehicle V based on the detection result from the external sensor 1 (S103).

The environment determining unit 18 determines whether the external environment of the vehicle V is an environment suitable for execution of automatic driving control based on the recognition result from the traveling environment recognizing unit 12 and the like (S104). When the external environment of the vehicle V is an environment suitable for execution of automatic driving control (YES in S104), the abnormality determining unit 19 determines that an abnormality has occurred in the automatic driving system 100 (S105). After it has been determined that an abnormality has occurred in the automatic driving system 100, the automatic driving system 100 performs a process of notifying a driver of the vehicle V that the automatic driving control is switched to manual driving control or the like as described above.

On the other hand, when the traveling state of the vehicle V is not abnormal (NO in S102), the abnormality determining unit 19 determines that the automatic driving system 100 operates normally (S106). When the traveling state of the vehicle V is abnormal (YES in S102) and the external environment of the vehicle V is not an environment suitable for execution of automatic driving control (NO in S104), the abnormality determining unit 19 determines that the automatic driving system 100 operates normally (S106).

As described above, when the traveling state determining unit 17 has determined that the traveling state of the vehicle V is abnormal and the environment determining unit 18 has determined that the external environment is an environment suitable for execution of automatic driving control, the abnormality determining unit 19 determines that an abnormality has occurred in the automatic driving system 100. That is, the case in which the environment determining unit 18 has determined that the external environment is an environment suitable for execution of automatic driving control but it is determined that the traveling state of the vehicle V is abnormal is considered to be a state in which an abnormality has occurred in the automatic driving system 100 and thus the vehicle V cannot travel normally. Accordingly, the abnormality determining unit 19 determines that an abnormality has occurred in the automatic driving system 100 in consideration of the external environment of the vehicle V (whether the external environment is an environment suitable for execution of automatic driving control) in addition to the traveling state of the vehicle V. In this way, the abnormality detection device 20 can accurately detect an abnormality in the automatic driving system 100 in consideration of the external environment of the vehicle V.

The environment determining unit 18 uses a road surface shape to determine that the external environment is an environment suitable for execution of automatic driving control. Specifically, when a difference 6 between the road surface shape stored in the map database 4 and the road surface shape recognized based on the detection result from the LIDAR 1a is less than a predetermined determination threshold value, the environment determining unit 18 determines that the external environment of the vehicle V is an environment suitable for execution of automatic driving control. In this way, the environment determining unit 18 can determine whether the external environment of the vehicle V is an environment suitable for execution of automatic driving control based on the road surface shape.

When the traveling state determining unit 17 has determined that the traveling state of the vehicle V is abnormal based on the yaw rate or the lateral acceleration of the vehicle V and the environment determining unit 18 has determined that the external environment is an environment suitable for execution of automatic driving control based on the road shape, the abnormality determining unit 19 determines that an abnormality has occurred in the automatic driving system 100. For example, when the vehicle travels on a straight road but the difference between the yaw rate actually detected using the yaw rate sensor 3a or the like and the yaw rate calculated based on the control command value or the like is large, it is thought that there is a likelihood of occurrence of an abnormality in which the vehicle V cannot travel straightly, such as wheel misalignment of the vehicle V or blowout of a tire. Accordingly, when it has been determined that the traveling state of the vehicle V is abnormal based on the yaw rate or the lateral acceleration and it has been determined that the external environment is an environment suitable for execution of automatic driving control based on the road shape, the abnormality determining unit 19 determines that an abnormality has occurred in the automatic driving system 100. Accordingly, the abnormality detection device 20 can accurately detect an abnormality in the automatic driving system 100 in consideration of the road shape as the external environment.

While an embodiment has been described above, the disclosure is not limited to the embodiment. For example, the embodiment can be embodied in various forms subjected to various modifications and improvements based on knowledge of those skilled in the art. In the embodiment, the abnormality detection device 20 is incorporated into the automatic driving system 100 that performs automatic driving control, but the automatic driving system that performs automatic driving control and the abnormality detection device 20 may be individually provided.

What is claimed is:

1. An abnormality detection device comprising:
    a sensor configured to detect an external environment of a vehicle; and
    an electronic control unit configured to:
        detect at least one of the speed, yaw rate, position or acceleration of the vehicle as a traveling state of the vehicle;
        acquire at least one expected value for the vehicle in automatic driving control, the vehicle being caused to travel automatically in the automatic driving control;
        determine, based on a difference between the traveling state and the at least one expected value, whether the traveling state is abnormal;
        determine, based on a detection result from the sensor, whether a road surface is suitable for execution of the automatic driving control; and
        determine that an abnormality has occurred in an automatic driving system that performs the automatic driving control based on determining that the traveling state is abnormal and that the road surface is suitable for the execution of the automatic driving control, wherein the abnormality of the automatic driving system is a malfunction in the sensor or a malfunction of a component of the vehicle that affects traveling of the vehicle,
    wherein the electronic control unit is further configured to perform a predetermined control of the vehicle based on determining that the abnormality has occurred in the automatic driving system,
    wherein the electronic control unit is configured to perform the automatic driving control based on determining that the abnormality has not occurred in the automatic driving system, and
    wherein the electronic control unit is configured to determine that the automatic driving system is in a normal state based on determining that the traveling state is abnormal and that the road surface is not suitable for the execution of the automatic driving control.

2. The abnormality detection device according to claim 1, further comprising a database storing an expected road surface shape of a traveling road of the vehicle as a stored road surface shape, wherein
    the sensor includes a LIDAR (light detection and ranging), the LIDAR being configured to irradiate surroundings of the vehicle with light and configured to detect reflected light of the irradiated light,
    the sensor is further configured to detect an actual road surface shape of the traveling road as a detected road surface shape based on a detection result from the LIDAR, and
    the electronic control unit is further configured to determine, when a difference between the stored road surface shape of the surroundings of the vehicle and the detected road surface shape is less than a predetermined determination threshold value, that the road surface is suitable for the execution of the automatic driving control.

3. The abnormality detection device according to claim 1, wherein
    the sensor includes a LIDAR (light detection and ranging), the LIDAR being configured to irradiate surroundings of the vehicle with light and configured to detect reflected light of the irradiated light, and
    the electronic control unit is further configured to:
        detect a measured yaw rate;
        calculate a predicted yaw rate, the predicted yaw rate being a yaw rate predicted when the vehicle travels based on the at least one expected value;
        determine that the traveling state is abnormal when a difference between the predicted yaw rate and the measured yaw rate is greater than a predetermined yaw rate threshold value;
        detect a road shape of a traveling road based on a detection result from the LIDAR;
        determine that the road surface is suitable for the execution of the automatic driving control when the road shape detected by the sensor is a straight line; and determine that the abnormality has occurred in the automatic driving system based on determining that the traveling state is abnormal and that the road surface is suitable for the execution of the automatic driving control based on the road shape of the traveling road.

4. The abnormality detection device according to claim 1, wherein
the sensor includes a LIDAR (light detection and ranging) and a camera, the LIDAR being configured to irradiate surroundings of the vehicle with light and configured to detect reflected light of the irradiated light, the camera being configured to capture an image of a traveling road of the vehicle, and
the electronic control unit is further configured to:
detect a measured yaw rate and a measured lateral acceleration of the vehicle as the traveling state;
calculate a predicted yaw rate and a predicted lateral acceleration, the predicted yaw rate being a yaw rate predicted when the vehicle travels based on the at least one expected value, the predicted lateral acceleration being a lateral acceleration predicted when the vehicle travels based on the at least one expected value;
determine that the traveling state is abnormal when at least one of subsequent conditions are satisfied, the conditions being (i) a condition that a difference between the predicted yaw rate and the measured yaw rate is greater than a predetermined yaw rate threshold value and (ii) a condition that a difference between the predicted lateral acceleration and the measured lateral acceleration is greater than a predetermined lateral acceleration threshold value;
detect a road shape of the traveling road based on a detection result from the LIDAR and the image captured by the camera;
determine that the road surface is suitable for the execution of the automatic driving control when the road shape detected by the sensor is a straight line; and
determine that the abnormality has occurred in the automatic driving system based on determining that the traveling state is abnormal and that the road surface is suitable for the execution of the automatic driving control based on the road shape of the traveling road.

5. The abnormality detection device according to claim 1, wherein the electronic control unit is further configured to notify a driver of the vehicle that the automatic driving control is switched to a manual driving control in which the driver performs a driving operation of the vehicle, based on determining that the abnormality has occurred in the automatic driving system.

6. The abnormality detection device according to claim 2, wherein the electronic control unit is further configured to detect road surface shapes including projections and depressions of the traveling road based on sensory output from the LIDAR.

7. The abnormality detection device according to claim 1, wherein the electronic control unit is further configured to:
detect a measured longitudinal acceleration of the vehicle as the traveling state;
calculate a predicted longitudinal acceleration, the predicted longitudinal acceleration being a longitudinal acceleration predicted when the vehicle travels based on the at least one expected value; and determine that the traveling state is abnormal when a difference between the predicted longitudinal acceleration and the measured longitudinal acceleration is greater than a predetermined longitudinal acceleration threshold value.

8. The abnormality detection device according to claim 1, wherein the electronic control unit is further configured to determine that the abnormality has occurred in the automatic driving system when a predetermined number of differences between expected values and measured traveling state values occur within a predetermined amount of time.

9. The abnormality detection device according to claim 1, wherein
the sensor includes a LIDAR (light detection and ranging), the LIDAR being configured to irradiate surroundings of the vehicle with light and configured to detect reflected light of the irradiated light, and
the electronic control unit is further configured to:
detect measured lateral acceleration of the vehicle as the traveling state;
calculate a predicted lateral acceleration, the predicted lateral acceleration being a lateral acceleration predicted when the vehicle travels based on the at least one expected value;
determine that the traveling state is abnormal when a condition that a difference between the predicted lateral acceleration and the measured lateral acceleration is greater than a predetermined lateral acceleration threshold value is satisfied;
detect a road shape of a traveling road based on a detection result from the LIDAR;
determine that the road surface is suitable for the execution of the automatic driving control when the road shape detected by the sensor is a straight line; and
determine that the abnormality has occurred in the automatic driving system based on determining that the traveling state is abnormal and that the road surface is suitable for the execution of the automatic driving control based on the road shape of the traveling road.

10. The abnormality detection device according to claim 1, wherein
the sensor includes a camera, the camera being configured to capture an image of a traveling road of the vehicle, and
the electronic control unit is further configured to:
detect a measured yaw rate;
calculate a predicted yaw rate, the predicted yaw rate being a yaw rate predicted when the vehicle travels based on the at least one expected value;
determine that the traveling state is abnormal when a difference between the predicted yaw rate and the measured yaw rate is greater than a predetermined yaw rate threshold value;
detect a road shape of the traveling road based on a detection result from the image captured by the camera;
determine that the road surface is suitable for the execution of the automatic driving control when the road shape detected by the sensor is a straight line; and
determine that the abnormality has occurred in the automatic driving system based on determining that the traveling state is abnormal and that the road surface is suitable for the execution of the automatic driving control based on the road shape of the traveling road.

11. The abnormality detection device according to claim 1, wherein
the sensor includes a camera, the camera being configured to capture an image of a traveling road of the vehicle, and
the electronic control unit is further configured to:
  detect a measured lateral acceleration of the vehicle as the traveling state;
  calculate a predicted lateral acceleration, the predicted lateral acceleration being a lateral acceleration predicted when the vehicle travels based on the at least one expected value;
  determine that the traveling state is abnormal when a difference between the predicted lateral acceleration and the measured lateral acceleration is greater than a predetermined lateral acceleration threshold value;
  detect a road shape of the traveling road based on a detection result from the image captured by the camera;
  determine that the road surface is suitable for the execution of the automatic driving control when the road shape detected by the sensor is a straight line; and
  determine that the abnormality has occurred in the automatic driving system based on determining that the traveling state is abnormal and that the road surface is suitable for the execution of the automatic driving control based on the road shape of the traveling road.

12. The abnormality detection device according to claim 1, wherein the malfunction of the component of the vehicle that affects traveling of the vehicle includes a blown out tire or a deviated wheel alignment.

* * * * *